Jan. 3, 1967 J. H. McADAMS 3,296,356

RADIO FREQUENCY ELECTROMAGNETIC ENERGY R.F. BARRIER

Filed March 2, 1965 2 Sheets-Sheet 1

James H. McAdams
INVENTOR.

Harry M. Saragovitz
BY Edward J. Kelly
Herbert Berl
Robert C. Sims

Jan. 3, 1967 J. H. McADAMS 3,296,356

RADIO FREQUENCY ELECTROMAGNETIC ENERGY R.F. BARRIER

Filed March 2, 1965 2 Sheets-Sheet 2

James H. McAdams
INVENTOR.

BY Harry M. Saragovitz
Edward J. Kelly
Herbert Berl
Robert C Sims 3,296,356
RADIO FREQUENCY ELECTROMAGNETIC ENERGY R.F. BARRIER James H. McAdams, Huntsville, Ala., assignor to the United States of America as represented by the Secretary of the Army Filed Mar. 2, 1965, Ser. No. 436,700
3 Claims. (Cl. 174—35)

The invention described herein may be manufactured and used by or for the Government for governmental purposes without the payment of any royalty thereon.

This invention relates to an electromagnetic shielding device. More specifically this invention relates to a conducting flexible material intended to prevent transfer of electromagnetic energy through gaps or interstices between the walls of a structure and a door or the like which covers any aperture in the structure. The device is to be interposed between the door and structure, retained in or through a slot and contacted by a conducting member.

Shielding devices for covering openings in the past have been in the form of conventional door structures and have not been sufficiently effective since these doors have failed to provide a complete shield for the opening. The reasons for this is that unless one makes the door fit within very close tolerances, a gap or interstice will occur, and electromagnetic energy may enter therethrough. The need is therefore presented for a device which fill these gaps with R.F. barrier material while at the same time allowing the door to be easily removed and replaced.

It is, therefore, an object of this invention to provide an improved shielding device.

Another object of the present invention is to provide intimate contact between an area of a contact member and a flexible conductor.

A still further object to the invention is to reduce the importance of mechanical alignment and mating between a housing and cover device.

The invention further resides in certain novel features of construction, combinations and arrangements of parts. Further objects and advantages of the invention will be apparent to those skilled in the art to which it pertains, from the following description of preferred embodiments thereof described with reference to the accompanying drawing, which forms a part of the specification, and wherein the same reference characters represent corresponding parts throughout the drawing, and in which.

Figure 5:
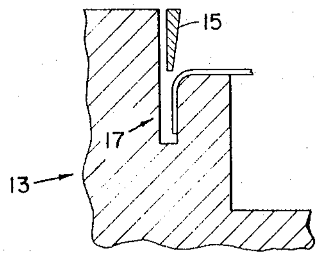
Figure 6:
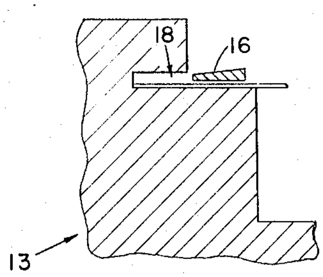
Figure 7:
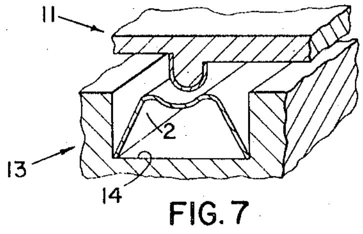
Figure 8:
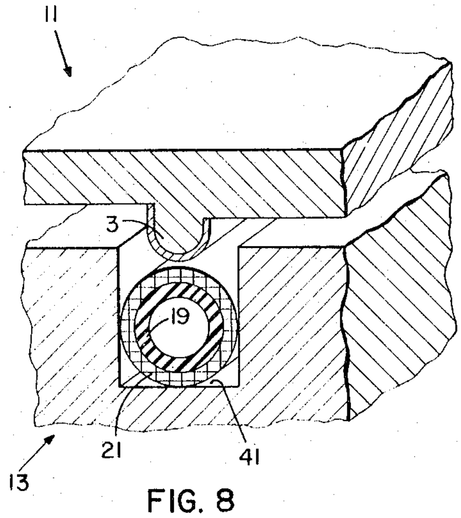
Figure 9:
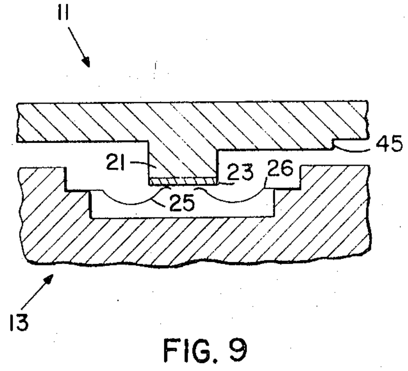
Figure 11:
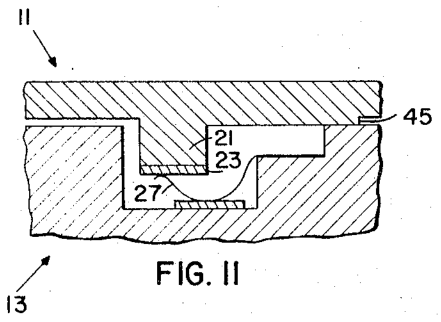
Figure 10:
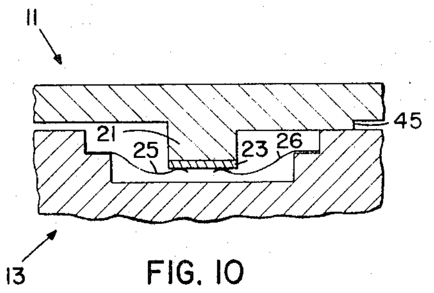
Figure 12:
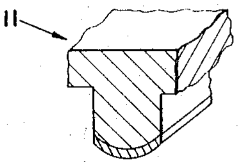

FIGURES 5, 6, and 7 show installation of the R.F. barrier material in the invention;

FIGURE 8 illustrates another embodiment of the invention in perspective cut-away view;

FIGURE 9 shows a further embodiment of the invention;

FIGURE 10 shows the embodiment of FIGURE 9 in the closed position;

FIGURE 11 sets forth a still further embodiment of the present invention;

FIGURE 12 is a curved rib contact arm which can be used in this invention; and

Figure 13:
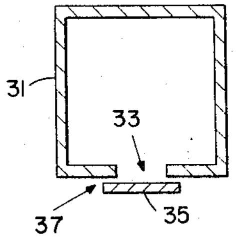

FIGURE 13 is a sectional view of a housing which can incorporate the invention.

Figure 1:
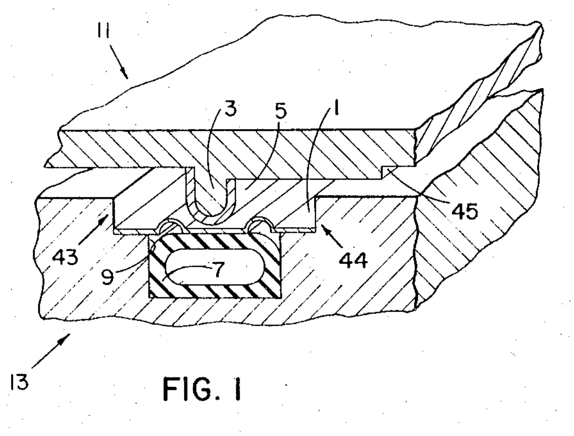
FIGURE 1 is a perspective view showing one embodiment of the invention in an open end noncontacting condition.
Figure 3A:
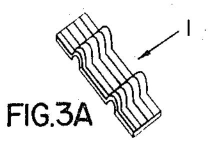
FIGURES 3A and 3B show conducting R.F. barrier materials which can be used in this invention.
Figure 3B:
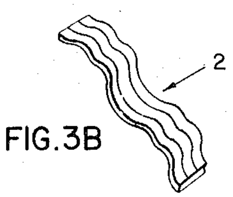
Figure 2:
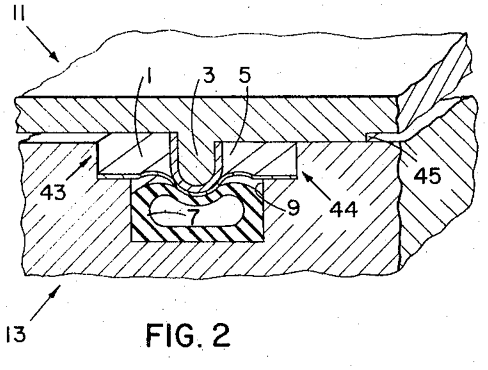
FIGURE 2 illustrates the embodiment of FIGURE 1 in the closed and contacting position.

FIGURES 1, 2, and 7 show the installation of conducting material 1 or 2 such as that shown in FIGURES 3A and 3B. Materials 1 and 2 have convolutions therein to allow it to flex. The materials 1 and 2 can be used interchangeably in these figures. A rib contacting member 3 can have a superior conductive material 5 covering it. The materials 1, 2, and 5 are R.F. barrier materials. If member 3 has sufficient contact conductivity, then material 5 may be omitted. A resilient support member 7 is placed in a trough or slot 9. However, due to spring property of materials 1 and 2, the resilient support member may be omitted as is shown in FIGURE 7. When in the closed position as illustrated in FIGURE 2, it can be seen that the two R.F. barrier materials 1 and 5 will be in intimate contact with each other even if the two members 11 and 13 are not an exact fit. It should be noted in FIGURE 2 that a mechanical stop mechanism is in effect at the right of the figure, and that members 11 and 13 are conducting members. Further, since there is electrical contact between 1 and 5, they act as if they were a single R.F. barrier material. Even if a gap were to be assumed between 1 and 5, it would be a curved gap surroundded by R.F. barrier material. This can easily be seen in the showing of FIGURE 2.

Figure 4A:
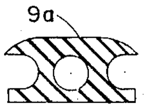
FIGURES 4A and 4B illustrate alternate configurations of resilient material.
Figure 4B:
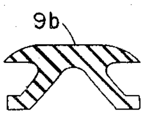

FIGURES 4A and 4B show other configurations of the resilient material that may be used in place of material 9. Of course, as mentioned above, no resilient material need be used for the embodiment of FIGURES 1 and 2 to operate.

FIGURES 5, 6 and 7 show how the material 1 or 2 is installed. FIGURES 5 and 6 show how a wedge 15 or 16 is fitted into a slot 17 or 18 so as to secure the R.F. barrier material. This method can be used in the showings of FIGURES 8, 9 and 10 also.

FIGURE 7 shows a different way of installing the conducting material 1 or 2. FIGURE 7 also shows a different construction of the slot in member 13. The wire 2 is inserted into the single slot 14 of FIGURE 7 by bending its edges so that it takes a flattened M shape, placing it into the slot, and allowing conductor 2 to expand therein. This expansion provides a good contact of the springlike material 2 (or 1) with member 13. Also, this expansion will support conductor 2 within the slot. With this type of installment, there is no need for the extra steps 43 and 44 in the member 13 as shown in FIGURES 1 and 2. If the resilient material is to be used, then the conductor would first be placed around the resilient material and then both the wire and the resilient material are inserted into the slot.

FIGURE 8 shows an embodiment similar to that of FIGURE 7 in that it has members 11 and 13 which are to come into close contact. Member 13 has a trough or slot 41, and member 11 has a contacting rib 3. A compressive material 19 has a conductive coating or layer of R.F. barrier material 21 surrounding it and is held in the slot 41 like conductor 2 in FIGURE 7. When the rib comes down in a closed position, the material 21 will contact it and also form around it so as to present the curved gap as mentioned above.

FIGURES 9 and 10 show flat rib member 21 having a conducting plate which is brazed, welded, or soldered at its edges. Two R.F. barrier materials 25 and 26 are constructed so as to be in the shape of a long flat tongue. In the closed position (FIGURE 10) with the stop mechanism 45 engaged the plate is in contact with the two R.F. barrier materials 25 and 26; therefore closing any gap or interstices between body 11 and 13 with respect to electromagnetic energy. FIGURE 11 operates in the same manner as FIGURES 9 and 10. However, only one R.F. barrier material 27 is used. FIGURE 12 shows a curved rib member which can replace that of FIGURES 9, 10, and 11.

In FIGURE 13 is shown a sectional view of a box type housing 31 which is made of electromagnetic opaque material. Housing 31 has an aperture 33 formed therein. To prevent transmission of electromagnetic energy through the aperture there is provided a door or cover 35 which may be overlapping as shown or fitted into the aperture. In either case gaps or interstices 37 will occur if there is not an exact fit between the cover and the housing. The cover may be supported in any conventional manner such as pivoted hinges, clamps, etc. The embodiments of the invention are utilized to prevent the entry of electromagnetic energy through these gaps. The troughs 9 of the embodiments may be placed in either the cover or the body of the housing; therefore elements 31 and 35 may correspond to members 11 and 13. The trough will surround the aperture 33 in the manner of a gasket.

A preferred embodiment of the invention has been chosen for purposes of illustration and description. The preferred embodiment illustrated is not intended to be exhaustive not to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is therefore to be understood that within the scope of the appended claims the invention may be practiced otherwise than as specifically described. Accordingly, it is desired that the scope of the invention be limited only by the appended claims.

I claim:

1. A shielding device comprising first and second members which are to fit together, said first member having a contacting area thereon, said second member having a trough therein, a flexible electromagnetic barrier means inserted within said trough, said contacting area making contact and compressing said flexible electromagnetic barrier means when the first and second members are fitted together, said contacting area being covered with electromagnetic barrier material, said electromagnetic barrier means being a flexible material constructed so as to be in the shape of a long flat tongue, slot means in said second member on either side of said trough, wedge means, said barrier means having edges inserted in said slot means, and said wedge means being positioned to wedge said edges in said slot means, whereby said barrier means is retained within the trough.

2. A shielding device as set forth in claim 1, wherein said contacting area has a contacting surface which is covered with a flat conducting plate.

3. A shielding device as set forth in claim 1, wherein said contacting area has a contacting surface which is covered with a curved conducting plate.

References Cited by the Examiner

UNITED STATES PATENTS

| | | | |
|---|---|---|---|
| 2,727,084 | 12/1955 | Schreiber | 174—35 |
| 2,757,225 | 7/1956 | Dunn | 174—35 |
| 2,958,754 | 11/1960 | Hahn. | |
| 3,013,103 | 12/1961 | Pettler et al. | 174—35 |
| 3,219,747 | 11/1965 | McAdams | 174—35 |

FOREIGN PATENTS

| | | |
|---|---|---|
| 93,577 | 6/1962 | Denmark. |
| 936,639 | 12/1955 | Germany. |
| 909,009 | 10/1962 | Great Britain. |

LEWIS H. MYERS, *Primary Examiner.*

D. L. CLAY, *Assistant Examiner.*